United States Patent [19]

Bruno et al.

[11] 3,862,299
[45] Jan. 21, 1975

[54] TECHNETIUM-99M ALBUMIN AGGREGATES

[75] Inventors: Gerald A. Bruno, Shrewsbury; Thomas A. Haney, East Brunswick; Puthucode N. Rajamani, North Brunswick, all of N.J.

[73] Assignee: E. R. Squibb & Sons, Inc., New York, N.Y.

[22] Filed: June 26, 1973

[21] Appl. No.: 373,694

Related U.S. Application Data

[63] Continuation of Ser. No. 74,882, Sept. 23, 1970, abandoned.

[52] U.S. Cl. .............................. 424/1, 252/301.1 R
[51] Int. Cl. ............................................ A61k 27/04
[58] Field of Search ................. 424/1; 252/301.1 R; 23/230 B

[56] References Cited
UNITED STATES PATENTS
3,674,900   7/1972   Thompson ............................. 424/1

OTHER PUBLICATIONS

DePaoli et al., Nuclear Science Abstracts, Vol. 20, No. 23, Dec. 15, 1966, item No. 43390.
Stern et al., Nuc. Sci. Abs., Vol. 20, No. 15, pp. 3295–3296, item No. 27028, Aug. 1966.
Gwyther et al., Int. Journ. of Applied Radiation and Isotopes, 1966, Vol. 17, pp. 485–6, Pergamon Press, Ltd.
Cragin et al., Journal of Nuclear Medicine, 10, (10), 621–623 (1969).

Primary Examiner—Benjamin R. Padgett
Attorney, Agent, or Firm—Lawrence S. Levinson; Merle J. Smith; Donald J. Barrack

[57] ABSTRACT

Disclosed herein is an aggregate comprising coprecipitated Technetium—99m sulfur colloid and denatured albumin colloid. These aggregates can be utilized in scanning lungs to determine the health of the pulmonary circulation.

4 Claims, No Drawings

TECHNETIUM-99M ALBUMIN AGGREGATES

This application is a continuation of United States application, Ser. No. 74,882, filed Sept. 23, 1970, now abandoned.

PRIOR ART

The recent introduction of sterile, nonpyrogenic Technetium-99m to the commercial market has opened new vistas for this short-lived isotope. It has resulted in numerous applications which heretofore were unknown. Among these applications is one wherein Technetium-99m is formulated into a sulfur colloid and thereafter injected into a patient. This colloid has been found to localize in various tissues and/or organs to enable the medical practitioner to scan for malfunctions and determine its health.

Numerous methods are disclosed in the literature for the preparation of an insoluble colloidal Technetium-99m sulfur composition. One method involves the preparation of insoluble Technetium heptasulfide from sodium pertechnetate solution by utilizing hydrogen sulfide gas. Another procedure which is fairly simple and efficient for the formation of Technetium-99m sulfur colloid utilizes sodium thiosulfate rather than hydrogen sulfide as a means for forming the Technetium-99m sulfur colloid.

A more detailed discussion of Technetium-99m sulfur colloid appears in the article, "Preparation, Distribution and Utilization of Technetium-99m Sulfur Colloid" by Stern, H. S.; Macafee, J. C.; and Subramanian, G., appearing in the JOURNAL OF NUCLEAR MEDICINE, Vol. 7, pages 665–675 (1965). An improvement in preparing the Technetium-99m sulfur colloid disclosed therein is the subject of copending U.S. application Ser. No. 791,173, filed Jan. 14, 1969, now U.S. Pat. No. 3,683,066.

THE INVENTION

This invention relates to a form of Technetium-99m sulfur colloid which together with denatured albumin is coprecipitated to form macroaggregates and thus render them useful as lung-scanning agents. The exact chemical reactions that take place in these colloidal systems are not known, however, the coprecipitate comes out as Technetium-99m interspersed in denatured albumin. In the past, iodine 131 has been utilized to carry on a diagnostic procedure whereby the health of the pulmonary system within the patient could be determined. It has now been discovered that the more preferred Technetium-99m isotope can be aggregated in the form of a liquid suspension that makes this ideal isotope Technetium-99m localize in the lung tissue. The macroaggregates of the invention are exceptionally preferred for this particular use as they clear the lungs within a period of from about 4 to 24 hours.

A solution containing these macroaggregates can be injected by the practitioner into a patient (for example, cat, dog, cow or human) and will be trapped in the capillaries of the lung to show via a radiological scan if there is blockage within the pulmonary system. The amount of solution to be injected into the patient is determined by the practitioner utilizing known means. Generally it is determined by the amount of radioactivity in the solution. The amount of radioactivity in each suspension which is needed to perform a satisfactory scan will vary between about 0.1 millicuries to 10 millicuries for each ml. of suspension. The suspension of this invention which contains the macroaggregates is prepared by aseptically:

1. Reacting a sulfur-producing reagent with an acid in the presence of Technetium-99m to produce Technetium-99m sulfur colloid;
2. adding denatured albumin thereto;
3. adjusting the pH of the reaction solution to the isoelectric point of the denatured albumin to form aggregates of coprecipitated Technetium-99m sulfur colloid and denatured albumin; and
4. heating the coprecipitated colloid to form uniform particle sizes of from between about 10 microns to 100 microns.

The source of sulfur may be any known reagent or gas which produces sulfur. Those which may be utilized in the practice of the invention are hydrogen sulfide gas and alkali metal thiosulfates such as sodium thiosulfate and potassium thiosulfate. Others which give similar results and form aggregates are the alkaline earth metal thiosulfates such as magnesium thiosulfate. It is desirable to utilize from about 5 mg. to 25 mg. of the source of sulfur per ml. of solution. A more preferred result is obtained, however, when from about 10 to 20 mg. of the source of sulfur is utilized per ml. of solution.

When a thiosulfate is utilized as the source of sulfur, in particular an alkali metal thiosulfate, e.g., sodium thiosulfate or potassium thiosulfate, an inorganic base such as alkali metal phosphate (e.g., sodium phosphate, potassium phosphate and so forth) an alkali metal hydroxide (e.g., sodium hydroxide, potassium hydroxide) or an alkali metal bicarbonate (e.g., sodium bicarbonate) may be incorporated into the solution, with the thiosulfate to maintain the pH of the solution above a pH of about 7 and act as a stabilizing agent as the thiosulfate is unstable below a pH of 7. This stablizing agent is present in from about 5 to 15 mg/ml of solution and optimally about 5 to 9 mg/ml of solution.

In carrying out the process of this invention, reaction solutions are prepared under non-pyrogenic and aseptic conditions utilizing sterile glassware acceptable in pharmaceutical practice into a patient without sterilization. In other words, the final solution of this invention is to be injected directly into humans. Therefore, a vial of solution of the source of sulfur and buffering agent is prepared with non-pyrogenic water and sterilized by autoclaving or sterile filtration. To this solution which is in a vial, the practitioner adds the desired amount of sterile Technetium-99m in a saline solution as predetermined by him. This isotope reagent is obtained from a sterile pyrogen-free generator as described in U.S. Pat. No. 3,369,121. It is to be understood that the amount of radioactivity desired is the governing factor in how much Technetium-99m is to be utilized as stated above. Measurement of quantities of Technetium-99m being impractical as it is present in varying amounts depending on the activity of the generator and when it was last utilized. The reaction proceeds equally well by reversing the addition of reagents in solution to Technetium-99m.

For purposes of convenience the reagents are stored after preparation in vials which may be easily equipped with hypodermic syringes and injected into each other by known procedures. One way of carrying out this procedure is to place the reagents in Unimatic[R] syringes, thus the reagents would be placed into approximately four vials: Vial A being the reaction vial which is subsequently to be injected into the patient, although either vials may be so utilized; Vial B would be the acid vial; Vial C would contain denatured albumin and Vial D contain a buffering agent or alkaline solution. In carrying out the process of this invention the Technetium sulfur colloid would be formulated by injecting a Technetium-99m saline solution and an inorganic acid such as hydrochloric acid, sulfuric acid, and/or nitric acid into Vial A. This reaction can be carried out at ambient temperature but to increase the rate of reaction, the reaction temperature should be between 90° and 100° C., but preferably between 95° and 100° C. After approximately from about 7 to 20 minutes of heating, Technetium-99m sulfur colloid is formed. The exact chemical reaction and mechanism which take place are unknown due to the low amount of Technetium-99m utilized. However, what has become known in the art as a Technetium-99m sulfur colloid is formed.

Denatured colloidal albumin is added to reaction vial A. On completion of this step, the pH of the solution is adjusted to the isoelectric point of the albumin from between about pH 4.5 to 6, preferably about pH 4.9 to 5.5, best results occurrring at pH 5.3. This causes a coprecipitate of the Technetium-99m sulfur colloid and denatured albumin to form which has particulate size of about 1 micron.

The utilization of denatured albumin is extremely beneficial as it permits the aggregates to be formed in the desired size. The aggregates of this invention are then formed by heating it from 90° to 100° C. for about between 2 to 20 minutes, but preferably from between about 2 to 5 minutes to form about 10 to 100 microns with the preferred size being from about 30 to 50 microns. It has been discovered that continuous heating will not excessively hinder the aggregates. After obtaining the desired size, they do not thereafter significantly increase in size on continuous heat. Further, it has been found that the aggregates become more difficult to break down as demonstrated in in vivo testing.

The denatured albumin of this invention is known in the art as first stage denatured albumin and can be prepared by any known means. However, it is preferred to prepare it by heating and alkylization of normal serum albumin (NSA). Human normal serum albumin is to be utilized when the test is to be performed in humans and appropriate animal serum is utilized when the test is performed on cows, dogs, rats, and so forth. The NSA is heated to a temperature of from between about 65°–85° C, but more preferably from between about 75°–84° C for from 15 to 60 minutes, depending on the quantity of albumin utilized. The larger quantity of albumin requiring longer periods of time than smaller quantities. Utilizing an inorganic acid such as sulfuric acid, hydrochloric acid, nitric acid, and the like, an organic base such as sodium acetate, acetic acid buffer solution, an inorganic base such as alkali metal hydroxide (e.g., sodium hydroxide), or alkali metal bicarbonate (e.g., sodium bicarbonate) the pH of the albumin is adjusted to between about pH 5 to 6, but preferably to pH 5.5. This causes denatured albumin to precipitate. A colloid of denatured albumin precipitate can then be formed by dissolving the precipitate in base such as alkali metal hydroxide, e.g., sodium hydroxide or potassium hydroxide. This resulting solution is then adjusted to a pH of between about 7 to 8 with an inorganic acid such as hydrochloric acid, sulfuric acid, citric acid, and so forth.

The following examples are illustrative of this invention. All temperatures are in degrees centigrades, unless otherwise stated.

EXAMPLES 1–22

The reagents and procedural outline for making 22 preparations of Technetium-99m sulfur colloid and denatured albumin coprecipitated aggregates are described in Tables 1 and 2 as precipitation.

Each preparation is tested for radiochemical binding and the amount of the injected dose that located in the lungs and liver of rats. After preparations are made, exactly 0.25 ml is injected into the external jugular vein of rats. Three rats are used per preparation. After a resident time of 15 minutes in the rats, they are sacrificed and the percent of the injected dose in the lungs and liver determined. To determine the radiochemical binding, a count rate on the remainder of each formualtion is made. They are then centrifuged and a count rate taken on the decanted supernatants only. The percent radiochemical binding is determined as follows:

% Binding = Total count rate − Supernatant count rate × 100 /Total count rate

TABLE 1

Methods for Preparing Technetium—99m Sulfur Colloid Denatured Albumin Colloid Coprecipitate Aggregate Formulations

| Example number | Volume added (m.l.) and length of treatment | | | | | | | | | | |
|---|---|---|---|---|---|---|---|---|---|---|---|
| | 1 | 2 | 3 | 4 | 5 | 6 | 7 | 8 | 9 | 10 | 11 |
| Reagents, order of addition and treatment: | | | | | | | | | | | |
| Reaction solution (each ml. contains 6 mg. $Na_2S_2O_3 \cdot 5H_2O$ and 4.25 mg. potassium phosphate dibasic) | 2 | 2 | 2 | 2 | 2 | 2 | 2 | 2 | 2 | 2 | 2 |
| Tc-99m eluate | 1 | 1 | 5 | 3 | 2 | 1 | 1 | 1 | 1 | 1 | 1 |
| HCl acid (0.25 N) | 2 | 2 | 2 | 2 | 2 | 2 | 2 | 2 | 2 | 2 | 2 |
| Time in boiling water bath (min.) | 10 | 10 | 10 | 10 | 10 | 10 | 10 | 10 | 10 | 10 | 10 |
| Denatured colloidal albumin (having 2.5 mg./ml.) | 2 | 2 | 2 | 2 | 2 | 2 | 2 | 2 | 2 | 2 | 2 |
| Stabilizing solution (each ml. contains 129.75 mg. sodium acetate and 10.1 mg. acetic acid per ml.) | 2 | 2 | 2 | 2 | 2 | 2 | 2 | 2 | 2 | 2 | 2 |
| Time in boiling water bath (min.) | 5 | 5 | 5 | 5 | 5 | 5 | 1 | 2 | 3 | 4 | 5 |
| Final albumin concentration in final aggregated formulation (mg./ml) | 0.28 | 0.45 | 0.55 | 0.656 | 0.722 | 0.8 | 0.8 | 0.8 | 0.8 | 0.8 | 0.8 |
| Test results: | | | | | | | | | | | |
| pH | 5.20 | 5.15 | 5.13 | 5.13 | 5.16 | 5.13 | 5.19 | 5.19 | 5.19 | 5.20 | 5.19 |
| Particle size | 10–50μ | 10–50μ | 10–50μ | 10–50μ | 10–50μ | 10–50μ | 10–50μ | 10–50μ | 10–50μ | 10–50μ | 10–50μ |
| Percent radiochemical binding | 98 | 99 | 99 | 99 | 99 | 99 | 99.7 | 99.5 | 99.6 | 99.4 | 99.6 |
| Percent of injected dose in lungs | 82.32 | 75.48 | 95.0 | 105.0 | 92.4 | 80.3 | 69 | 84 | 95 | 96 | 107 |
| Percent of injected dose in liver | 11.22 | 5.67 | 4.9 | 2.2 | 2.6 | 2.0 | 19 | 18 | 7 | 3.5 | 0.7 |

TABLE 2

Methods of Preparing Technetium—99m Sulfur Colloid Denatured Albumin Colloid Coprecipitate Aggregate Formulations

| Example number | \multicolumn{11}{c}{Volume added (ml.) and length of treatment} |
|---|---|---|---|---|---|---|---|---|---|---|---|

| Example number | 12 | 13 | 14 | 15 | 16 | 17 | 18 | 19 | 20 | 21 | 22 |
|---|---|---|---|---|---|---|---|---|---|---|---|
| Reagents, order of addition and treatment: | | | | | | | | | | | |
| Reaction solution (each ml. contains 6 mg. $Na_2S_2O_3 \cdot 5H_2O$ and 4.25 mg. potassium phosphate dibasic) | 2 | 2 | 2 | 2 | 2 | 2 | 2 | 2 | 2 | 2 | 4 |
| Tc–99m eluate | 1 | 5 | 1 | 1 | 1 | 1 | 1 | 1 | 1 | 1 | 1 |
| HCl acid (0.25 N) | 2 | 2 | 2 | 2 | 2 | 2 | — | 2.2 | 2.2 | 1.8 | 1.8 |
| Time in boiling water bath (min.) | 10 | 10 | 10 | 10 | 10 | 10 | 10 | 10 | 10 | 10 | 10 |
| Denatured colloidal albumin (having 2.5 mg./ml.) | 2 | 2 | 2 | 2 | 2 | 2 | 2 | 2 | 2 | 2 | 2 |
| Stabilizing solution (each ml. contains 51.9 mg. sodium acetate and 4.04 mg. acetic acid per ml.) | 2 | 2 | 2 | 2 | 2 | 2 | 2 | 1.8 | 2.2 | 1.8 | 2.2 |
| Time in boiling water bath (min.) | 5 | 5 | 1 | 2 | 3 | 4 | 5 | 5 | 5 | 5 | 5 |
| Final albumin concentration in final aggregated formulation (mg./ml.) | 0.560 | 0.385 | 0.560 | 0.560 | 0.560 | 0.560 | 0.560 | 0.56 | 0.53 | 0.57 | 0.56 |
| Test results: | | | | | | | | | | | |
| pH | 5.07 | 5.00 | 5.08 | 5.10 | 5.09 | 5.11 | 5.10 | 4.98 | 5.05 | 5.12 | 5.17 |
| Particle size | 10–50μ | 10–50μ | 10–50μ | 10–50μ | 10–50μ | 10–50μ | 10–50μ | 10–50μ | 10–50μ | 10–50μ | 10–50μ |
| Percent radiochemical binding | 99.1 | 97.6 | 99.5 | 99.3 | 99.3 | 99.6 | 99.1 | 98 | 98 | 99 | 98 |
| Percent injected dose in lungs | 84.05 | 105.63 | 94.91 | 95.01 | 100 | 106.9 | 98.83 | 101 | 95 | 72 | 101 |
| Percent injected dose in liver | 2.43 | 4.36 | 10 | 6.4 | 2.5 | 2.1 | 2.18 | 3.7 | 3.5 | 2.3 | 3 |

EXAMPLES 23 AND 24

The following two examples illustrate the half-life of Technetium-99m sulfur colloid and denatured albumin colloid coprecipitated aggregates in the lungs of animals. Table 3 illustrates the formulation of these aggregates and Table 4 illustrates the test results within the lung of an animal.

TABLE 3

Determination of Biological Half-Life of MacroTec Formulations

| Reagents Order of Addition and Treatment | Preparation No. 23 | Preparation No. 24 |
|---|---|---|
| Reaction Solution (Each ml. contains 6 mg. $Na_2S_2O_3 \cdot 5H_2O$ and 4.25 mg. potassium phosphate dibasic) | 2 | 2 |
| Tc-99m Eluate | 1 | 1 |
| HCl Acid (0.25 N) | 2 | 2 |
| Time in Boiling Water Bath (Min.) 10 | 10 | 10 |
| Cool Solution to Room Temperature | No | No |
| Denatured Colloidal Albumin (3.61 mg./ml.) | 2 | 2 |
| Stabilizing Solution (Each ml. contains 129.75 mg. Sodium Acetate and 10.1 mg. Acetic Acid per ml.) | 2 | 2 |
| Time in Boiling Water Bath (Min.) | 5 | 5 |

TABLE 4

| Test Results | Preparation Number 23 | Preparation Number 24 |
|---|---|---|
| pH | 5.39 | 5.34 |
| % Radiochemical Binding | 99.68 | 99.6 |
| % Injected Dose in Lungs (Animals Sacrificed After 15 Min.) | 105% | 104% |
| % Injected Dose in Liver (Animals Sacrificed After 15 Min.) | 1.34% | 1.88% |
| % Injected Dose in Lungs (Animals Sacrificed After 4 Hours) | 51% | 43.5% |
| % Injected Dose in Liver (Animals Sacrificed After 4 Hours) | 43.6% | |
| Particle Size | 10–50μ | 10–50μ |

From the above it is clearly seen that the biological half-life of the aggregate in the lung is relatively short.

The length of time to prepare the aggregates of this invention is extremely fast and can be accomplished in practice in approximately 15 to 30 minutes, whereas utilizing techniques known to the art preparations for scanning lungs currently known take up to 120 to 180 minutes.

What is claimed is:

1. A process of preparing a macroaggregate composed of coprecipitated Technetium-99m sulfur colloid and denatured albumin colloid which comprises reacting a sulfur producing reagent with an acid in the presence of Technetium-99m to produce Technetium-99m sulfur colloid; adding denatured albumin thereto; adjusting the pH of the reaction solution to the isoelectric point of the denatured albumin to form aggregates of coprecipitated Technetium-99m sulfur colloid and denatured albumin; and heating the coprecipitated colloid to form uniform particle sizes of from between about 10 microns to 100 microns.

2. A process in accordance with claim 1 wherein the sulfur producing reagent is an alkali metal thiosulfate.

3. A process in accordance with claim 2 wherein the denatured albumin is normal serum albumin.

4. A process in accordance with claim 3 wherein the albumin is in the first stage of denaturation.

\* \* \* \* \*

UNITED STATES PATENT OFFICE
CERTIFICATE OF CORRECTION

Patent No. 3,862,299　　　　　　　Dated January 21, 1975

Inventor(s) Gerald A. Bruno, et al

It is certified that error appears in the above-identified patent and that said Letters Patent are hereby corrected as shown below:

Column 5, line 41, Table 3, delete the number "10" after the words "Time in Boiling Water Bath (Min.)".

Column 5, line 41, Table 3, insert the number -- 10 -- under "Preparation No. 24".

Column 6, Table 2, Example 22, first line, delete "4" and substitute in its place -- 2 --.

Column 6, Table 4, line 27 should read as follows:
-- % Injected Dose in Liver (Animals　　　30%　　　43.6% --
with the "30%" directly under Preparation No. 23 and the "43.6%" directly under Preparation No. 24.

Signed and sealed this 8th day of April 1975.

(SEAL)
Attest:

RUTH C. MASON
Attesting Officer

C. MARSHALL DANN
Commissioner of Patents
and Trademarks